US008386472B2

(12) United States Patent
Phibbs et al.

(10) Patent No.: US 8,386,472 B2
(45) Date of Patent: Feb. 26, 2013

(54) TECHNIQUES FOR DATABASE RULE ORDERING AND PROCESSING

(75) Inventors: Paul H. Phibbs, Escondido, CA (US); Marianne Ruegsegger, Escondido, CA (US); Linette Draper, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 715 days.

(21) Appl. No.: 12/351,471

(22) Filed: Jan. 9, 2009

(65) Prior Publication Data

US 2010/0185601 A1 Jul. 22, 2010

(51) Int. Cl.
*G06F 17/30* (2006.01)

(52) U.S. Cl. ......................... 707/718; 707/759; 707/803

(58) Field of Classification Search .................. 707/759, 707/803, 718

See application file for complete search history.

(56) References Cited

U.S. PATENT DOCUMENTS

| | | | | |
|---|---|---|---|---|
| 6,173,290 | B1 * | 1/2001 | Goldberg | 707/687 |
| 6,671,680 | B1 * | 12/2003 | Iwamoto et al. | 707/737 |
| 6,718,322 | B1 | 4/2004 | Brye | |
| 6,785,668 | B1 * | 8/2004 | Polo et al. | 707/771 |
| 2001/0007104 | A1 * | 7/2001 | Goldberg | 707/1 |
| 2003/0191731 | A1 | 10/2003 | Stewart et al. | |
| 2006/0294079 | A1 * | 12/2006 | Dettinger et al. | 707/3 |
| 2007/0094186 | A1 | 4/2007 | Ramkissoon et al. | |

* cited by examiner

*Primary Examiner* — Shahid Alam

(74) *Attorney, Agent, or Firm* — Schwegman, Lundberg & Woessner, P.A

(57) ABSTRACT

Techniques for database rule ordering and processing are provided. Structured Query Language (SQL) statements are iterated to identify processing dependencies and a processing order is generated. The SQL statements are automatically modified to enforce the processing order and the modified SQL statements are executed against a database.

17 Claims, 3 Drawing Sheets

TECHNIQUES FOR DATABASE RULE ORDERING AND PROCESSING

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots for a report tool as described below and in any drawings hereto: Copyright© 2008, Teradata, Inc. All Rights Reserved.

BACKGROUND

Enterprises now track all aspects of their business electronically. Every transaction with a customer, information about the customer, inventory, capital, expenses, etc. are captured, indexed, and stored in an enterprise's database. Very quickly the enterprise's database becomes enormous in size having a plethora of information. Accordingly, enterprises are increasingly relying on their information for driving and managing all aspects of their business operations.

In fact, enterprises often develop reports and real-time statistics from their databases. Typically, the interface for achieving these reports and statistics is a Structured Query Language (SQL). Often, analysts develop complex SQL statements that execute against the database for purposes of gaining different insight into the details of the business.

These SQL statements can include a variety of nested and complex rules and may rely on results from prior SQL queries. Unfortunately, SQL processing is usually done in a sequential manner, which means that the analysts has to know and structure the SQL statements in a specific order to ensure things are properly processed. If the analyst is not savvy enough to do this, then the results may not be accurate and in some cases the SQL statements may not process at all.

S0, structuring SQL statements for complex operations against an enterprise's database is a time consuming and skilled exercise. Unfortunately, in today's highly competitive and fast-paced economy few enterprises have the time and necessary skilled human resources to effectively achieve competitive report processing and statistical analysis for their chaotic business environment.

As a result, improved techniques for ordering and processing database transactions are needed.

SUMMARY

In various embodiments, techniques for database rule ordering and processing are provided. More particularly, a method for resolving an order for processing rules in a database transaction is provided. Specifically.

DETAILED DESCRIPTION

Figure 1:
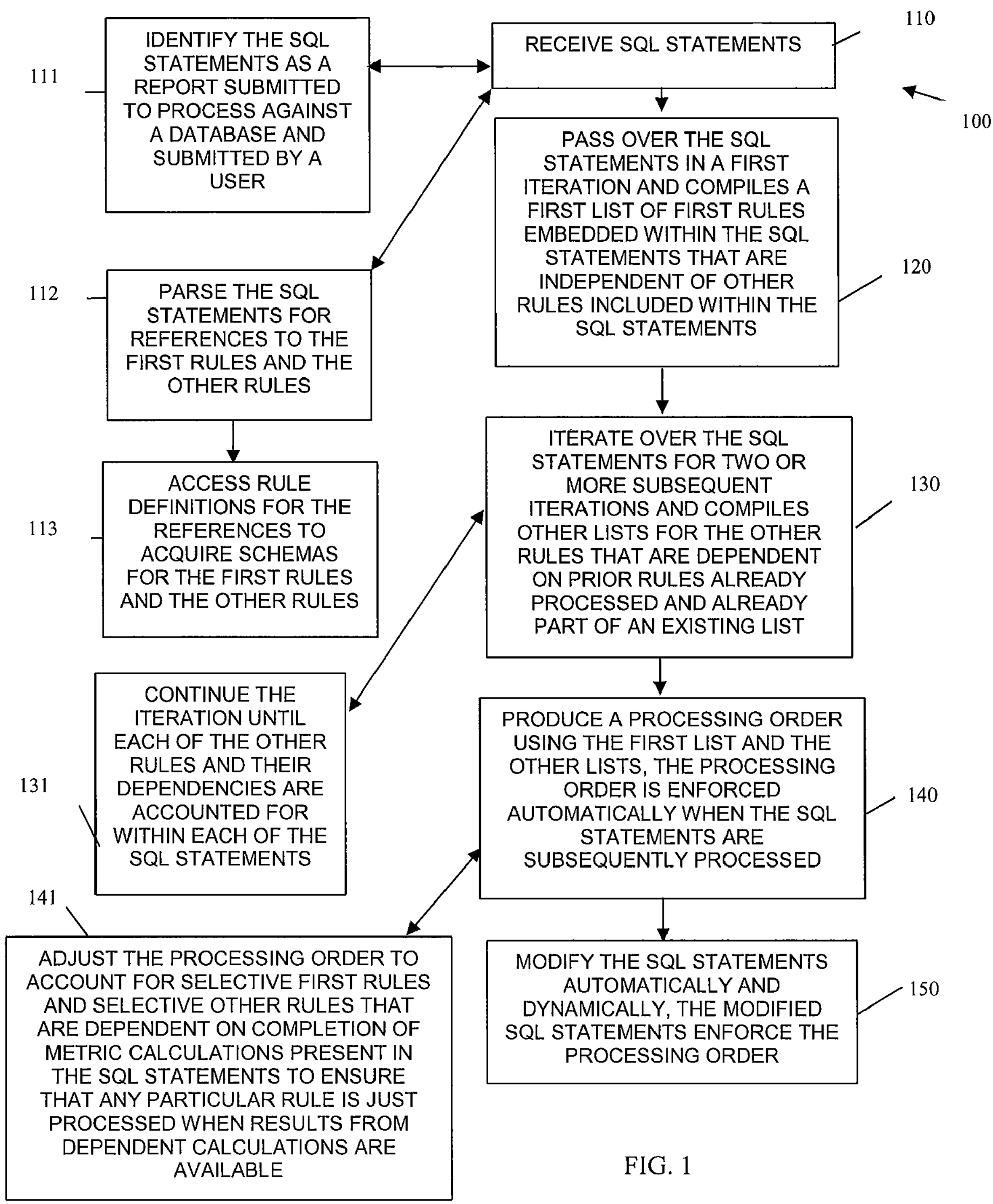
FIG. 1 is a diagram of a method for resolving an order for processing rules in a database transaction, according to an example embodiment.

FIG. 1 is a diagram of a method 100 for resolving an order for processing rules in a database transaction, according to an example embodiment. The method 100 (herein after referred to as "rule ordering service") is implemented in machine-accessible or computer-readable storage medium as instructions that are executed by one or more machines (processors, computers, etc.). Moreover, the rule ordering service is accessible over a network. The network may be wired, wireless, or a combination of wired and wireless.

A "database" as used herein refers to a relational database. In an embodiment, the database uses a Structured Query Language (SQL) interface.

A "statement" is a set of SQL operations that are capable of being processed by a database's Application Programming Interface (API) to perform database operations, such as queries. The results associated with processing the statement(s) can be reports, statistics, other database tables, etc.

A "rule" is a conditional comparison identified in a statement, such as If X then Y or When X Do Y, and the like. Rules can have labels and can be accessed by reference or via a name from statements and some rules can incorporate other rules, such as When (Rule X) Do (Rule Y), etc. So, rules can be accessed by reference, nested, simple, complex, etc., and the rules are embedded in statements.

It is within this initial context that the processing associated with the rule ordering service is now discussed in detail.

At 110, the rule ordering service receives SQL statements. The statements may be received in a variety of manners.

For example, at 111, the SQL statements are identified as being received as a report that is being submitted by a user to process against a database.

In other cases, the SQL statements can be associated with complex searches, reports, and/or queries that are housed in a library or the database and passed to the rule ordering service for processing.

According to an embodiment, at 112, the rule ordering service parses the SQL statements for references, labels, or names to the first rules (discussed below) and the other rules (also discussed below).

Continuing with the embodiment at 112 and at 113, the rule ordering service access rule definitions for the references to acquire schemas for the first rules and the other rules. The schemas define the rules (conditions or policies that are to be evaluated and processed).

At 120, the rule ordering service passes over the SQL statements in a first iteration and compiles a first list of first rules embedded within the SQL statements that are independent of other rules included within the SQL statements. In other words, the first rules are independent of and do not rely on or need any other rules for processing.

At 130, the rule ordering service iterates over the SQL statements for two or more subsequent iterations and compiles other lists for the other rules. The other rules are each dependent on prior rules already processed and already part of an existing list. For example, suppose RULE Y is stated as WHEN RULE X DO Z; here RULE Y is dependent on processing RULE X meaning that RULE X has to be processed before the results of RULE Y can be resolved. This is but one example other more complex situations can also exist and fall within the teachings presented herein.

According to an embodiment, at 131, the rule ordering service continues the iteration processing until each of the other rules and their dependencies are accounted for within each of the SQL statements. So, the processing at 130 is repeated for two or more additional iterations beyond the first iteration until dependencies for each rule in the SQL statements is resolved or known.

At 140, the rule ordering service produces a processing order using the first list and the other lists. The processing order is enforced automatically and dynamically when the SQL statements are subsequently processed.

In an embodiment, at 141, the rule ordering service adjusts the processing order to account for selective first rules and selective other rules that are dependent on completion of metric calculations present in the SQL statements. This is done to ensure that any particular rule is just and only processed when results from dependent calculations are available. So, some rules may rely on metric calculations, such as but not limited to Other Revenue (OR), Indirect Expense (IE), Direct Expense (DE), Allocated Capital (AC), Risk Provision (RP), and/or others.

According to an embodiment, at 150, the rule ordering service modifies the SQL statements automatically and dynamically. The modified SQL statements enforce the processing order of the SQL statements as a whole.

One now appreciates how the rule ordering service can be used to essentially preprocess a set of SQL statements (such as reports, etc.). This is done for purposes of automatically and dynamically resolving a proper processing order. The user or creator of the SQL statements does not have to worry about developing a complex version of the original SQL statements because the rule ordering service does that automatically for the user in a transparent and dynamic manner and ensures the proper processing order is achieved in a modified version of the SQL statements.

It is noted that rules can be dependent on or more other rules as discussed above (source or driver). These dependencies can exist either with or across metrics. For example, the results of RULE 1 can be acquired as a driver for processing RULE 2, and RULE 2 results can be required as a source input for RULES 3 and 4. Also, rules can require a metric calculation result (DE, OR, etc.) for source or driver. These things imply a processing order that the rule ordering service automatically and dynamically resolves. As detailed above, and in an example, the rule ordering service makes at least two passes on the SQL statements. In a first pass the rule ordering service compiles a list of rules that are not dependent on any other rules or metrics in the SQL statements. In a second pass the rule ordering service compiles a list of rules that are dependent on the rules from the first pass, and so on (via multiple additional iterations as needed). Any rules that require a metric result wait until such a metric result exists. This scenario of processing continues and is repeated until there are no more unprocessed rules remaining in the SQL statements being processed. By listing the rules included within the SQL statements during each pass or iteration of the SQL statements, the rule ordering service resolves the proper and needed processing order for the rules included within the SQL statements.

The rule ordering service has the logic and information gathering capabilities to align rules in the SQL statements in a proper processing order, regardless of the number of levels or rules or the complexity or rules desired by a user.

Figure 2:
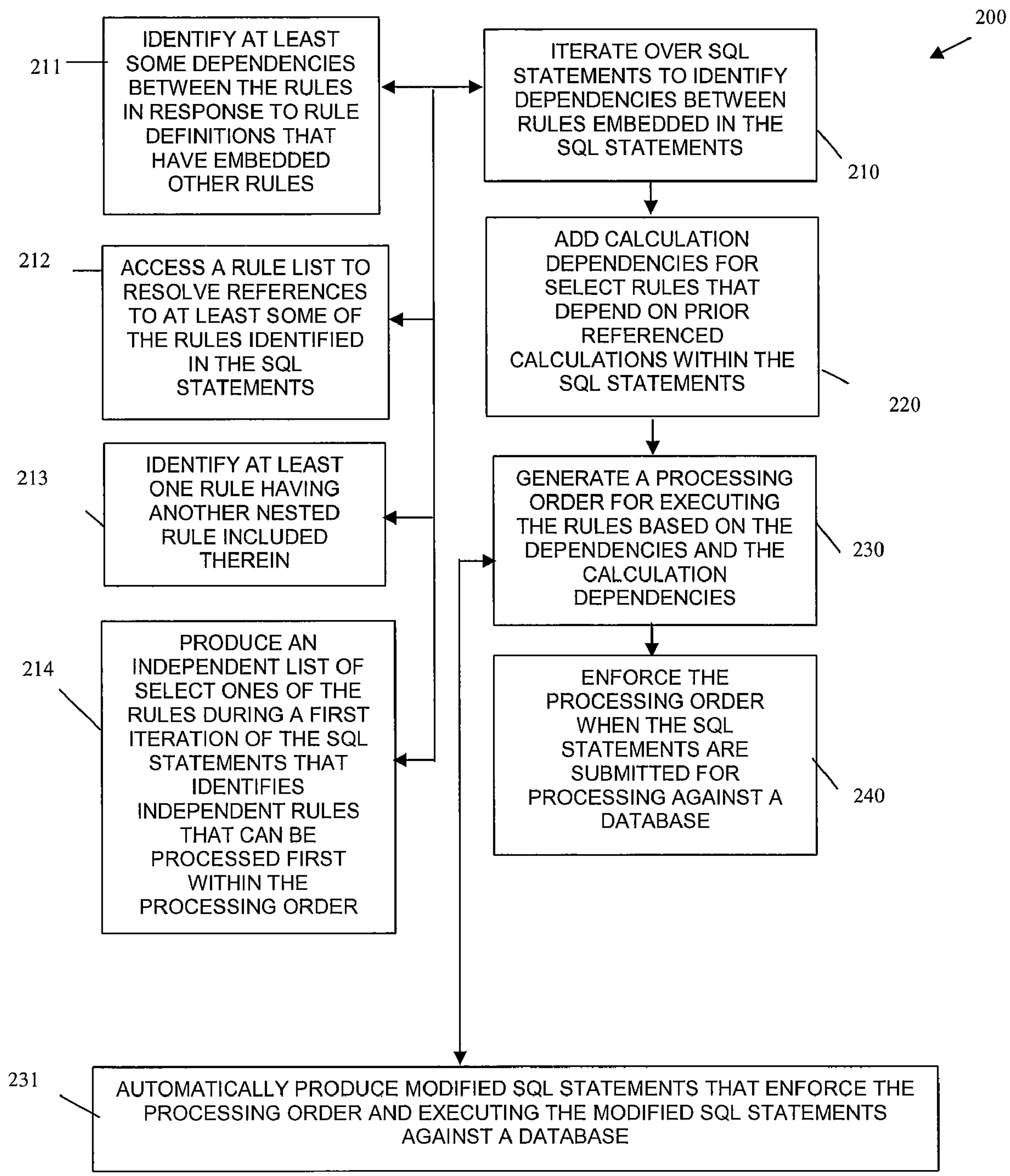
FIG. 2 is a diagram of another method for resolving an order for processing rules in a database transaction, according to an example embodiment.

FIG. 2 is a diagram of another method 200 for resolving an order for processing rules in a database transaction, according to an example embodiment. The method 200 (hereinafter referred to as "database statement service") is implemented in a machine-accessible and computer-readable storage medium as instructions that when executed by a machine (processor, computer, etc.) performs the processing depicted in FIG. 2. Moreover, database statement service is operational over a network, which may be wired, wireless, or a combination of wired and wireless.

The database statement service provides another and in some cases enhanced perspective to the rule ordering service represented by the method 100 of the FIG. 1, discussed in detail above.

At 210, the database statement service iterates over SQL statements to identify dependencies between rules embedded in the SQL statements.

According to an embodiment, at 211, the database statement service identifies at least some dependencies between the rules in response to rule definitions that have embedded other rules included therein.

In another case, at 212, the database statement service accesses a rule list to resolve references to at least some of the rules identified in the SQL statements. That is, the SQL statements identify the rules as a reference or name and the rule list includes a match for the rules and permits definitions or schemas for the rules to be resolved.

In another situation, at 213, the database statement service identifies at least one rule having another nested rule included therein. This is an example where RULE X includes a reference to RULE Y.

In a particular case, at 214, the database statement service produces an independent list of select ones of the rules during a first iteration of the SQL statements that identifies independent rules, which can be processed first within the processing order. In other words, the rules identified in the first iteration are not dependent on any other rules or metric calculation processing.

At 220, the database statement service adds calculation dependencies for select rules that depend on prior referenced calculations within the SQL statements. The SQL statements include references to metric calculations within some of the rules or SQL statements. The database statement service notes these and ensures that these are resolved before those rules or SQL statements are processed within the processing order.

At 230, the database statement service generates a processing order for executing rules based on the dependencies and the calculation dependencies.

According to an embodiment, at 231, the database statement service automatically produces modified SQL statements that enforce the processing order and executes the modified SQL statements against a database. Thus, the original SQL statements are dynamically and automatically altered to adjust for the proper processing order that the database statement service determined based on the processing 210-230.

In an embodiment, at 240, the database statement service enforces the processing order when the SQL statements are submitted against a database.

In this manner, a user that issues the SQL statements as database queries or reports does not have to account for all the proper dependencies and the processing order because the database statement service resolves that dynamically and ensures that the processing order is enforced when the SQL statements are processed against the database.

Figure 3:
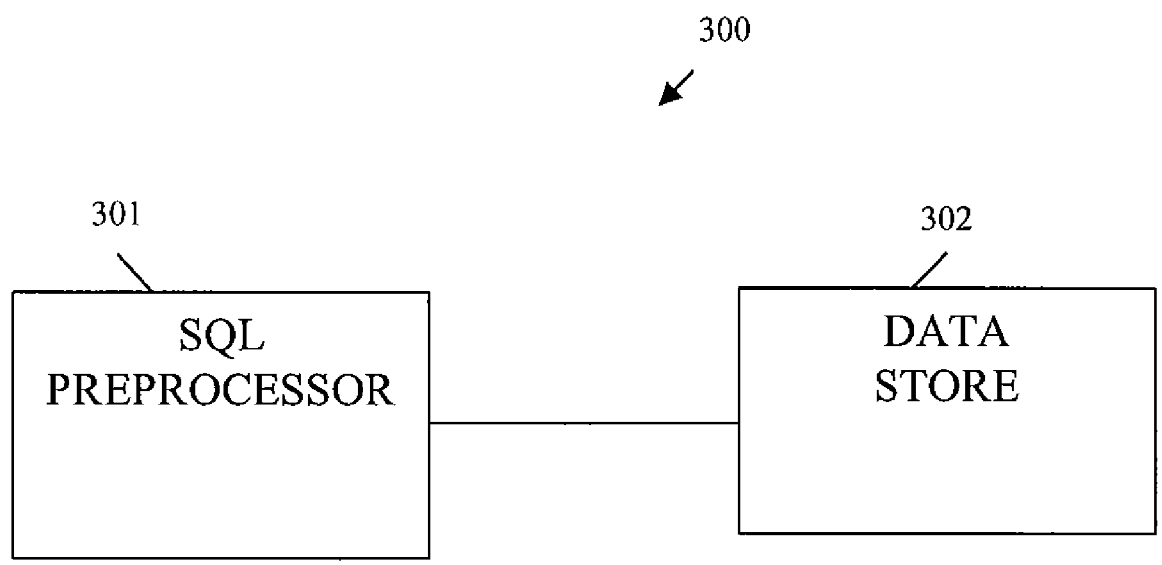
FIG. 3 is a diagram of a database rule ordering system, according to an example embodiment.

FIG. 3 is a diagram of a database rule ordering system 300, according to an example embodiment. The database rule ordering system 300 is implemented in a machine-accessible and computer-readable storage medium as instructions that when executed by a machine(s) (processor(s), computer(s), etc.) performs a variety of processing, such as the processing discussed in detail above with reference to the methods 100 and 200 of the FIGS. 1 and 2.

The database rule ordering system 300 includes a SQL preprocessor 301 and a data store 302. Each of these and their interactions with one another will now be discussed in detail.

The SQL preprocessor 301 is implemented in a computer-readable storage medium and is executed by a processor of a network. Example processing and features associated with the SQL preprocessor 301 were presented in detail above with reference to the methods 100 and 200 of the FIGS. 1 and 2, respectively.

The SQL preprocessor 301 iterates SQL statements to automatically and dynamically generate a processing order for rules referenced within the SQL statements. Also the SQL preprocessor 301 produces modified SQL statements that enforce the processing order. Furthermore, the SQL preprocessor 301 executes the modified SQL statements against the data store 302.

In an embodiment, the SQL preprocessor 301 iterates the SQL statements to identify rule and calculation dependencies within the SQL statements for purposes of generating the processing order.

According to an embodiment, the SQL preprocessor 301 accesses rule definitions when generating the processing order.

In some cases, the SQL statements are submitted by a user that is attempting to generate a report from the data store 302.

The data store 302 is implemented in a computer-readable storage medium and is accessible to the SQL preprocessor 301 as well as an SQL interface that permits users, analysts, and administrators to access the data store 302.

The data store 302 includes tables having rule definitions for the rules that the SQL preprocessor 301 uses when producing the processing order.

In an embodiment, the data store 302 is a data warehouse that includes a collection of databases logically organized and accessible as a single unit.

It is now appreciated how complex rules embedded in SQL statements for purposes of generating reports or statistics can automatically and dynamically resolve a processing order without requiring an end-user to develop those SQL statements in a predefined and complicated manner. An example set of operations implemented in a computer-readable storage medium and capable of being processed by one or more processors is now presented as one embodiment and as an illustration of the techniques presented herein and above.

It is understood that other embodiments may be used to achieve the teachings presented herein and above and that the example source code presented below is but one implementation capable with the teachings presented.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and processed by a processor to perform the method, comprising:

receiving Structured Query Language (SQL) statements;

passing over the SQL statements in a first iteration and compiling a first list of first rules embedded within the SQL statements that are independent of other rules included within the SQL statements;

iterating over the SQL statements for two or more subsequent iterations and compiling other lists for the other rules that are dependent on prior rules already processed and already part of an existing list; and automatically and dynamically producing a processing order using the first list and the other lists and the first list of rules, the other rules, and the prior rules are aligned in the processing order regardless of a number of levels for and complexity of the first list of rules, the other rules, and the prior rules, wherein the processing order is enforced automatically when the SQL statements are subsequently processed, the SQL statements modified based on the automatically and dynamically produced processing order, and wherein a user providing the SQL statements does not provide the processing order or the SQL statements, the method ensures proper ordering of the SQL statements in the modified SQL statements transparent to the user providing the SQL statements.

2. The method of claim 1, wherein receiving further includes identifying the SQL statements as a report submitted to process against a database and submitted by the user.

3. The method of claim 1, wherein receiving further includes parsing the SQL statements for references to the first rules and the other rules.

4. The method of claim 3 further comprising, accessing rule definitions for the references to acquire schemas for the first rules and the other rules.

5. The method of claim 1, wherein iterating further includes continuing the iteration until each of the other rules and their dependencies are accounted for within each of the SQL statements.

6. The method of claim 1, wherein producing further includes adjusting the processing order to account for selective first rules and selective other rules that are dependent on completion of metric calculations present in the SQL statements to ensure that any particular rule is just processed when results from dependent calculations are available.

7. A method implemented in a computer-readable storage medium and processed by a processor to perform the method, comprising:

iterating over Structured Query Language (SQL) statements to identify dependencies between rules embedded in the SQL statements, the SQL statements representing a query or report submitted by a user for execution and the SQL statements are preprocessed by the method processing;

adding calculation dependencies for select rules that depend on prior referenced calculations within the SQL statements; and automatically and dynamically generating a processing order for executing the rules based on the dependencies and the calculation dependencies and modifying the SQL statements based on the processing order transparent to the user and the processing order aligned with the rules and the select rules regardless of a number of levels for and complexity of the rules and the select rules, and wherein the user providing the SQL statements does not provide the processing order with the SQL statements.

8. The method of claim 7 further comprising, enforcing the processing order when the SQL statements are submitted for processing against a database.

9. The method of claim 7, wherein iterating further includes identifying at least some dependencies between the rules in response to rule definitions that have embedded other rules.

10. The method of claim 7, wherein iterating further includes accessing a rule list to resolve references to at least some of the rules identified in the SQL statements.

11. The method of claim 7, wherein iterating further includes identifying at least one rule having another nested rule included therein.

12. The method of claim 7, wherein iterating further includes producing an independent list of select ones of the rules during a first iteration of the SQL statements that identifies independent rules that can be processed first within the processing order.

13. A computer-implemented system that executes on one or more processors, the system comprising:

a Structured Query Language (SQL) preprocessor implemented in a computer-readable storage medium and executed by a processor of a network; and a data store implemented in a computer-readable storage medium and accessible to the SQL preprocessor;

wherein the SQL preprocessor iterates SQL statements to automatically and dynamically generate a processing order for rules referenced within the SQL statements, and wherein the SQL preprocessor produces modified SQL statements based on the processing order and the SQL preprocessor executes the modified SQL statements against the data store where processing of the SQL preprocessor is transparent to a user that submits the SQL statements as an SQL query and the processing order is aligned with the rules regardless of a number of levels for and complexity of the rules, and wherein the user providing the SQL statements does not provide the processing order with the SQL statements.

14. The system of claim 13, wherein the SQL preprocessor iterates the statements to identify rule and calculation dependencies within the SQL statements for purposes of generating the processing order.

15. The system of claim 13, wherein the SQL preprocessor accesses rule definitions when generating the processing order.

16. The system of claim 13, wherein the data store includes tables having rule definitions for the rules that the SQL preprocessor uses when producing the processing order.

17. The system of claim 13, wherein data store is a data warehouse that includes a collection of databases logically organized and accessible as a single unit.

* * * * *